Jan. 10, 1950   H. M. SYLVESTER ET AL   2,494,213
FLUID OPERATED SWITCH ASSEMBLY
Filed Feb. 27, 1946
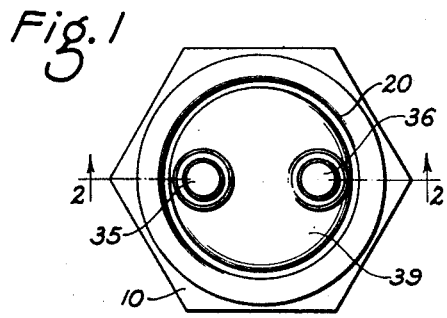
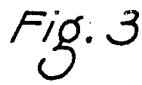
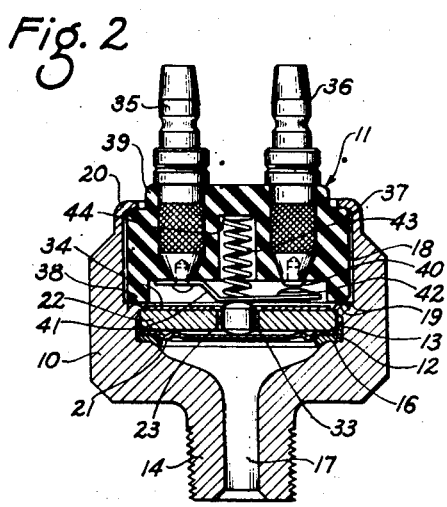
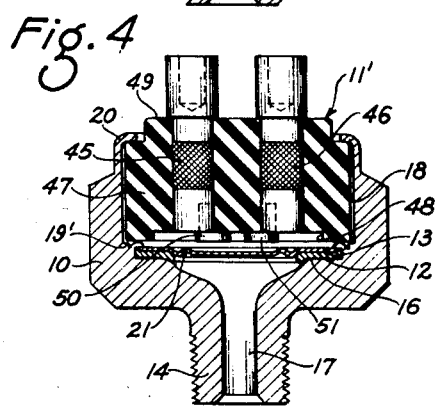
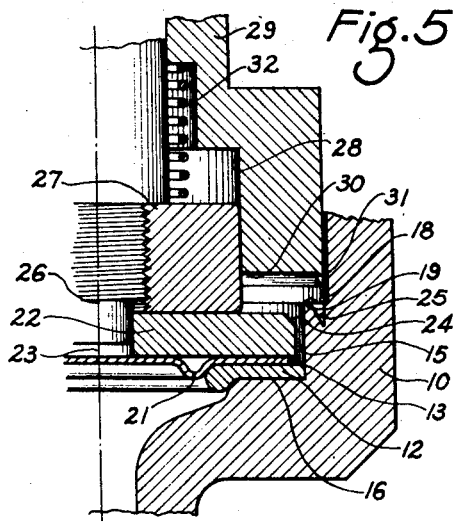
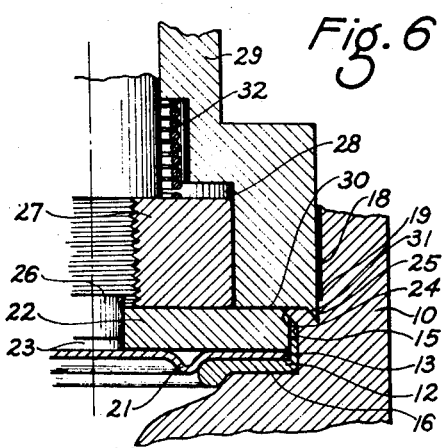
Harcourt M. Sylvester
Edward I. Rusk
INVENTORS
BY George A. Gillette, Jr.
ATTORNEY Patented Jan. 10, 1950

2,494,213

UNITED STATES PATENT OFFICE 2,494,213

FLUID OPERATED SWITCH ASSEMBLY

Harcourt M. Sylvester and Edward I. Rusk, Rochester, N. Y., assignors to Bendix Aviation Corporation, South Bend, Ind., a corporation of Delaware Application February 27, 1946, Serial No. 650,628

5 Claims. (Cl. 200—83)

1

The present invention relates to improvements in a fluid operated switch assembly.

A standard form of fluid operated switch used as an automotive stoplight switch and operated by fluid pressure from the hydraulic brake system may fail for either of two reasons. High temperatures resulting from an overload on the switch or for other reasons often cause the molded or Bakelite support for the switch assembly to shrink and become loose in the casing whereupon the pressure on the fluid tight seal between the casing and the diaphragm or gasket is reduced and leakage occurs. Also such high temperatures or other factors cause deterioration of the rubber gasket between the casing and diaphragm also to result in leakage of the hydraulic fluid or pressure. Obviously, in either case, the operation of the automotive hydraulic brake system may be seriously impaired and an extremely dangerous condition arises.

The primary object of the present invention is the provision of a shoulder formed integrally with the casing and exerting the sealing pressure on the diaphragm and gasket within the casing.

A further object of the invention is the provision of a sealing gasket composed of a ductile but resilient metal and forming a fluid tight seal between the casing and diaphragm or pressure plate.

Another object of the invention is the technique of deforming a shoulder integral with the casing for creating the sealing pressure on the diaphragm and gasket and/or for extruding the deformable gasket of rubber or ductile and resilient metal into the spaces between the casing and diaphragm or pressure plate to improve the tightness of the fluid seal therebetween.

In general, the present invention constitutes improvements of the fluid operated switches shown in Jensen United States Patent No. 2,249,208, granted July 15, 1941, to render them safer under conditions of high temperature or of practical usage.

Other and further objects of the invention will be suggested to those skilled in the art by the following description in conjunction with the accompanying drawings in which like reference characters designate similar parts and in which:

Fig. 1 is a top view of a fluid operated switch assembly according to the invention.

Fig. 2 is a vertical cross-section of a fluid operated switch assembly according to the invention and taken on the line 2—2 of Fig. 1.

Fig. 3 is a vertical cross-section through the

2 casing of the assembly having a deformable internal shoulder according to the invention.

Fig. 4 is a vertical cross-section of a fluid operated switch without a pressure plate and in which the internal and integral flange of the casing is deformed directly against the diaphragm.

Fig. 5 is a fragmentary vertical section through the switch casing and forming tool just prior to deformation of the internal integral shoulder.

Fig. 6 is a fragmentary vertical section like Fig. 5 but showing the forming tool in its final position and with the internal shoulder deformed and causing extrusion of the gasket according to the invention.

In the illustrated embodiments of the invention, the fluid operated switch assembly comprises generally a casing 10, a switch member 11, a gasket 12, and a flexible diaphragm 13.

The casing 10 is preferably made of steel which is cadmium plated or Parkerized and has a hexagonal shape. One end of the casing 10 is arranged for connection to a source of fluid pressure, such as the hydraulic brake system of a vehicle, and for that purpose has a threaded nipple 14 extending from one end of the casing 10. A cylindrical recess 15, see Fig. 3, is provided within casing 10 and provides a shoulder 16 in the cover part of casing 10. A fluid passage 17 extends through nipple 14 and to recess 15. A second cylindrical recess 18 is provided in casing 10 and has a larger diameter than the cylindrical recess 15 so that a shoulder 19 is formed internally of and integrally with the casing 10. The upper end of casing 10 is formed into cylindrical walls 20 which can be peened over for a purpose presently to be explained.

The gasket 12 is preferably in the form of a flat ring and may be composed of rubber or of a ductile and resilient metal such as lead, copper, or tin. Such gasket 12 is placed within cylindrical recess 15 and adjacent the shoulder 16.

The flexible diaphragm 13 is composed of a resilient material of high electrical conductivity, such as phosphor bronze, is circular in form and is provided with circular and concentric corrugations 21. Said diaphragm 13 is also placed within recess 15 adjacent the gasket 12.

A pressure plate 22 is provided with a central aperture 23 and is preferably composed of steel. Said pressure plate 22 is placed over the flexible diaphragm 13 and within the cylindrical recess 15. One peripheral edge of the pressure plate 22 may be beveled as indicated at 24 in Figs. 5 and 6. If pressure plate 22 is formed by punching, the small radius thereby formed on one peripheral edge may serve the same purpose.

The next step in the assembling of the fluid operated switch assembly is the deformation of the shoulder 19 to engage and overlap the edge of pressure plate 22. Such deformation may be facilitated by the provision of an annular groove 25 in said shoulder 19, see Fig. 5.

The deforming or peening tool comprises a pilot or plug 26 threaded into a holder 27 which is slidable in a cylindrical recess 28 within the tool body 29. The tool body 29 has a circular face 30 and a peripheral deforming edge 31. A coil spring 32 normally projects the pilot 26 ahead of the tool deforming edge 31 so that upon a downward strike of the tool, the pilot 26 centers the central aperture 23 and the holder 27 exerts a pressure on plate 22 to hold it in proper position, the casing 10 being mounted in a suitable fixture or chuck, not shown.

Continued downward movement of the tool causes said deforming edge 31 to penetrate shoulder 19 of the casing 10, or enter the annular groove 25, and to deform said shoulder 19 so that it engages and securely fixes pressure plate 22. At the same time sufficient pressure is exerted on the peripheral portion of diaphragm 13 and on gasket 12 to form a fluid-tight seal. The pressure, exerted by the deforming tool and by the deformed shoulder 19 may be great enough to cause deformation or extrusion of a portion of the gasket 12 into the space between the wall of recess 15 and the edge of diaphragm 13 and may be great enough to extrude some of the material of gasket 12 into the space between the wall of recess 15 and the edge of pressure plate 22. Such extrusion of the gasket 12 substantially increases the fluid tightness of the joints between the edge of diaphragm 13 and casing 10 and between the edge of plate 22 and said casing 10 and supplements the fluid tight joints between the opposite faces of gasket 12 and shoulder 16 and the lower face of diaphragm 13.

An actuating member 33, such as a Bakelite pin, is placed within aperture 23 in pressure plate 22 and a fiber washer 34 is placed upon said pressure plate 22.

The switch member 11 comprises a pair of terminals 35 and 36 molded into a plastic or Bakelite body member 37 which has an annular shoulder 38 at one end and a restricted portion 39 at the other end. A contact 40 is staked to terminal 36 and a switch arm 41 is staked at one end to terminal 35 and carries a contact 42 opposite contact 40. A coil spring 43 is placed within a recess 44 in body member 37 and urges switch arm 41 into operative engagement with actuating member 33.

Said switch member 11 is placed within said second cylindrical recess 18 and cylindrical walls 20 are peened over in a known manner to fasten said switch member 11 in place and to complete the assembling of said fluid operated switch assembly.

The present invention is also applicable to fluid operated switch assemblies which do not include a pressure plate. In such event the gasket 12 and flexible diaphragm 13 are placed within the cylindrical recess 15 as before. The deforming tool, without a pilot, is inserted through the larger diameter cylindrical recess 18 and deforms the shoulder 19' to overlap the rim of diaphragm 13. Likewise, the pressure of deformed shoulder 19' causes a fluid tight seal between the gasket 12, shoulder 16 and diaphragm 13 and may extrude the material of gasket 12 into the space between the peripheral edge of diaphragm 13 and the wall of recess 15 of the casing 10.

In this embodiment, the switch member 11' comprises a pair of terminals 45 and 46 molded into a plastic or Bakelite body member 47 provided at one end with a circular recess 48 and at its other end with a restricted portion 49. Contacts 50 and 51 are eccentrically staked to terminals 45 and 46 respectively and are located within recess 48 for engagement by the diaphragm 13 when it is deflected by a fluid pressure.

The switch member 11' is placed within the larger diameter cylindrical recess 18 and cylindrical walls 20 are peened over to secure said switch member in place.

It will now be evident that any shrinkage of the molded body members 37 and 47 or any loosening of the switch members 11 and 11' for any reason does not diminish or in any respect relieve the pressures on the fluid sealing joints of the fluid operated switch assembly. Furthermore, said body members 37 and 47 or the switch members 11 and 11' may become loose and float within the recess 18 without rendering the switch assemblies inoperative because the contacts 40 and 42 or 50 and 51 are not fouled or corroded by leaking hydraulic fluid.

Certain variations of the constructions of the switch assemblies are possible and are within the scope of the invention as defined by the claims which follow.

Having now particularly described our invention what we desire to secure by Letters Patent of the United States and what we claim is:

1. In a fluid operated switch assembly, a hollow casing having an opening in one end for connection to a source of fluid pressure, provided with a cylindrical recess for a switch assembly, and provided with a second recess smaller in diameter than the first mentioned recess, a gasket and a flexible diaphragm in the second mentioned recess, and an internal shoulder providing a stepped portion between said recesses and completely within and integral with said casing and deformed to engage and fix the periphery of said diaphragm with respect to said casing and to hold said gasket within said second recess and in fluid tight relation between and with respect to said diaphragm and said casing.

2. In a fluid operated switch assembly, a hollow casing having an opening in one end for connection to a source of fluid pressure, provided with a cylindrical recess for containing a switch assembly, and provided with a second cylindrical recess smaller in diameter than said first mentioned recess, a gasket, a flexible diaphragm and a pressure plate all within said smaller diameter recess, and an internal and integral stepped portion completely within said hollow casing between said recesses and deformed to engage and fix said pressure plate with respect to said casing and to hold said gasket and said diaphragm within said second recess and in fluid tight relation between and with respect to said casing and said pressure plate.

3. In a fluid operated switch assembly, a hollow casing having an opening in one end for connection to a source of fluid pressure, provided with a cylindrical recess for a switch assembly, and provided with a second recess smaller in diameter than the first mentioned recess, a gasket and a flexible diaphragm in the second mentioned recess, an internal shoulder providing a stepped portion between said recesses, completely within and integral with said casing and deformed to engage and fix said diaphragm and to hold said gasket within said second recess and in fluid tight relation between and with respect to said diaphragm and said casing, a switch assembly within the first mentioned recess and including a plastic body member, and an external flange on said casing deformed to engage said body member and press the same against the aforementioned deformed internal shoulder.

4. In a fluid operated switch assembly, a hollow casing having an opening in one end for connection to a source of fluid pressure, provided with a cylindrical recess for containing a switch assembly, and provided with a second cylindrical recess smaller in diameter than said first mentioned recess, a gasket, a flexible diaphragm and a pressure plate all within said smaller diameter recess, a beveled peripheral edge on said pressure plate, and an internal and integral shoulder providing a stepped portion completely within said casing between said recesses and deformed to engage the beveled edge of said pressure plate and fix the same with respect to said casing and to hold said gasket and said diaphragm in fluid tight relation between said casing and said pressure plate.

5. In a fluid operated switch assembly, a hollow casing having an opening in one end for connection to a source of fluid pressure, having at the other end a cylindrical recess, and provided with a second cylindrical recess forming an internal shoulder adjacent said opening and smaller in diameter than the first mentioned recess, a deformable gasket adjacent to and having a periphery overlying said shoulder, a flexible diaphragm adjacent to and having a periphery overlying the periphery of said gasket, a pressure plate provided with a central aperture and adjacent to and having a periphery overlying the periphery of said diaphragm, said gasket, diaphragm and plate all being within the second mentioned recess, a second internal and integral shoulder providing a stepped portion completely within said casing between said recesses and deformed to engage the periphery of said pressure plate and fix the same with respect to said casing and to hold said gasket and said diaphragm in fluid tight relation between said first mentioned shoulder and said pressure plate, a switch assembly within the first mentioned recess and including a plastic body member and a switch arm, and an actuating member in the aperture of said pressure plate and for transmitting motion of said diaphragm to said switch arm.

HARCOURT M. SYLVESTER.
EDWARD I. RUSK.

REFERENCES CITED

The following references are of record in the file of this patent:

UNITED STATES PATENTS

| Number | Name | Date |
|---|---|---|
| Re. 19,309 | Archer et al. | Sept. 11, 1934 |
| 351,660 | Shepard | Oct. 26, 1886 |
| 1,918,880 | White | July 18, 1933 |
| 1,958,297 | Decker | May 8, 1934 |
| 2,074,895 | Durant | Mar. 23, 1937 |
| 2,091,839 | Tangeman | Aug. 31, 1937 |
| 2,110,134 | Douglas | May 8, 1938 |
| 2,138,404 | Haas | Nov. 29, 1938 |
| 2,164,821 | Katcher | July 4, 1939 |
| 2,177,377 | Polivka | Oct. 4, 1939 |
| 2,216,201 | Keller | Oct. 1, 1940 |
| 2,249,208 | Jensen | July 15, 1941 |
| 2,253,629 | Kupferschmid | Aug. 26, 1941 |
| 2,275,556 | Rasmussen | Mar. 10, 1942 |

FOREIGN PATENTS

| Number | Country | Date |
|---|---|---|
| 3015/31 | Australia | July 10, 1931 |
| 404,470 | Great Britain | Jan. 18, 1934 |